United States Patent

Ohno et al.

[11] Patent Number: 6,118,511
[45] Date of Patent: Sep. 12, 2000

[54] MANUFACTURING METHOD OF LIQUID CRYSTAL DISPLAY PANEL AND CLEANING APPARATUS FOR USE THEREIN

[75] Inventors: Hiroki Ohno; Hiroshi Osaki, both of Kumamoto, Japan

[73] Assignee: Kabushiki Kaisha Advanced Display, Kumamoto, Japan

[21] Appl. No.: 09/294,331

[22] Filed: Apr. 20, 1999

[30] Foreign Application Priority Data

Apr. 23, 1998 [JP] Japan ................................. 10-113850

[51] Int. Cl.[7] .................................................. G02F 1/1333
[52] U.S. Cl. ........................................... 349/158; 349/124
[58] Field of Search ......................... 134/31, 902, 102.1; 428/1.2; 427/421; 349/124, 158, 187

[56] References Cited

U.S. PATENT DOCUMENTS 5,114,748  5/1992  Tada et al. ............................... 427/180

FOREIGN PATENT DOCUMENTS 6-235893  8/1994  Japan .

*Primary Examiner*—James A. Dudek
*Attorney, Agent, or Firm*—McDermott, Will & Emery

[57] ABSTRACT

A manufacturing method of a liquid crystal display panel of high display quality is provided, in which any foreign matter or stain on the surface of a substrate can be completely removed and occurrence of irregular orientation or spot is prevented in the cleaning step after rubbing in the manufacturing process of the liquid crystal display panel. A cleaning apparatus for carrying out the manufacturing method is also provided.

In the cleaning step after rubbing, as a pre-cleaning treatment, the surface of the glass substrate 1 is sufficiently covered by the mist-like particles 20 sprayed from a binary fluid nozzle 7 to the extent that the water does not move. Then, the glass substrate 1 is subject to a wet cleaning such as supersonic wave cleaning.

6 Claims, 5 Drawing Sheets

MANUFACTURING METHOD OF LIQUID CRYSTAL DISPLAY PANEL AND CLEANING APPARATUS FOR USE THEREIN

BACKGROUND AND SUMMARY OF THE INVENTION

1. Industrial Field

The present invention relates to a manufacturing method of a liquid crystal display panel which is used in liquid crystal display, liquid crystal shutter, etc. and to a cleaning apparatus which is used in manufacturing the liquid crystal display panel.

2. Prior Art

A conventional liquid crystal display panel is manufactured by the steps of forming and hardening an oriented film, after forming electrodes, etc. on a surface of a glass substrate; performing either a wet cleaning by wetting, cleaning, dewatering and drying using pure water, isopropyl alcohol, etc. or a dry cleaning by blowing with nitrogen gas, dry air, etc. to remove foreign matter stuck to the surface of the substrate due to rubbing treatment, after rubbing the surface of the oriented film using a cloth of nylon, rayon or the like and giving an orientation to the film; and causing two such substrates to face each other and charging a liquid crystal between the two substrates.

The Japanese Laid-Open Patent Publication (unexamined) Hei 6-235893 discloses a method for preventing an occurrence of irregular cleaning by supporting a rubbed substrate in a steam tank before performing the wet cleaning after the rubbing treatment.

In the dry cleaning after the rubbing treatment in the conventional manufacturing process of the liquid crystal display panel, a problem exists in that the foreign matter or stain stuck to the surface of the substrate at the time of rubbing is not sufficiently removed, and in the wet cleaning, a problem exists in that irregular orientation or spot occurs on the surface of the substrate at the time when water or cleaning agent strikes on the surface of the substrate due to a difference in striking pressure. Moreover, at the time of washing the foreign matter on the substrate by water or cleaning agent, another problem exists in that the irregular orientation or spot occurs due to the rubbing of the surface of the oriented film before wetting completely the substrate.

In the method disclosed in the mentioned Japanese Laid-Open Patent Publication (unexamined) Hei 6-235893, since it is necessary for the substrate to be supported in the steam tank, it is difficult to apply such a method to the process of treating continuously one substrate after another.

SUMMARY OF THE INVENTION

The present invention was made to solve the above-discussed problems and has an object of providing a manufacturing method of a liquid crystal display panel of high display quality in which any foreign matter or stain on the surface of a substrate can be completely removed and occurrence of irregular orientation or spot is prevented in the cleaning step after rubbing in the manufacturing process of the liquid crystal display panel.

Another object of the invention is to provide a cleaning apparatus capable of removing completely any foreign matter or stain on the surface of substrate and preventing the occurrence of irregular orientation or spot in the cleaning step after the rubbing treatment.

A manufacturing method of a liquid crystal display panel according to the invention, in which two substrates on each of which an electrode and an oriented film are formed are bonded facing each other and a liquid crystal is held between said two substrates, the manufacturing method including the steps of: forming a water film having no flow on the entire surface of the substrates after rubbing the oriented film, and wet cleaning the substrates on which the water film having no flow is formed by supersonic wave or by high pressure spray.

It is preferable that the water film having no flow on the surface of the substrates is formed by adhering mist-like particles to the surface of the substrates.

It is preferable that the mist-like particles are produced by using a binary fluid nozzle.

It is preferable that the mist-like particles are produced by using a supersonic wave humidifier.

It is preferable that the water film having no flow on the surface of the substrates comprises a dew condensation formed on the surface of the substrates by cooling the substrates.

A cleaning apparatus according to the invention, in which surface of substrates is cleaned after rubbing a surface of an oriented film formed on the substrates, the apparatus comprising a pre-cleaning treatment chamber for forming a water film having no flow on the entire surface of the substrate, and a wet cleaning chamber for wet cleaning the substrates on which the water film having no flow is formed by supersonic wave or by high pressure spray.

In the manufacturing method of the liquid crystal display of above steps, since the water film having no flow is formed on the surface of the substrates by adhesion or dew concentration of the mist-like particles, before performing the wet cleaning by supersonic wave cleaning or others in the cleaning step of the substrates after the rubbing, any movement of foreign matter on the substrates due to the cleaning before wetting completely the substrates can be prevented, occurrence of irregular orientation and spot due to pressure of cleaning water or to rubbing of the surface of the oriented film can be prevented, and therefore it is possible to provide a manufacturing method of a liquid crystal display panel of high display quality.

Further, it is possible to provide a cleaning apparatus capable of removing completely any foreign matter or stain on the surface of a substrate and preventing the occurrence of irregular orientation or spot in the cleaning step after the rubbing treatment.

Other objects, features and advantages of the invention will become apparent in the course of the following description with reference to the accompanying drawings.

DESCRIPTION OF THE PREFERRED EMBODIMENT

EXAMPLE 1

Figure 1:
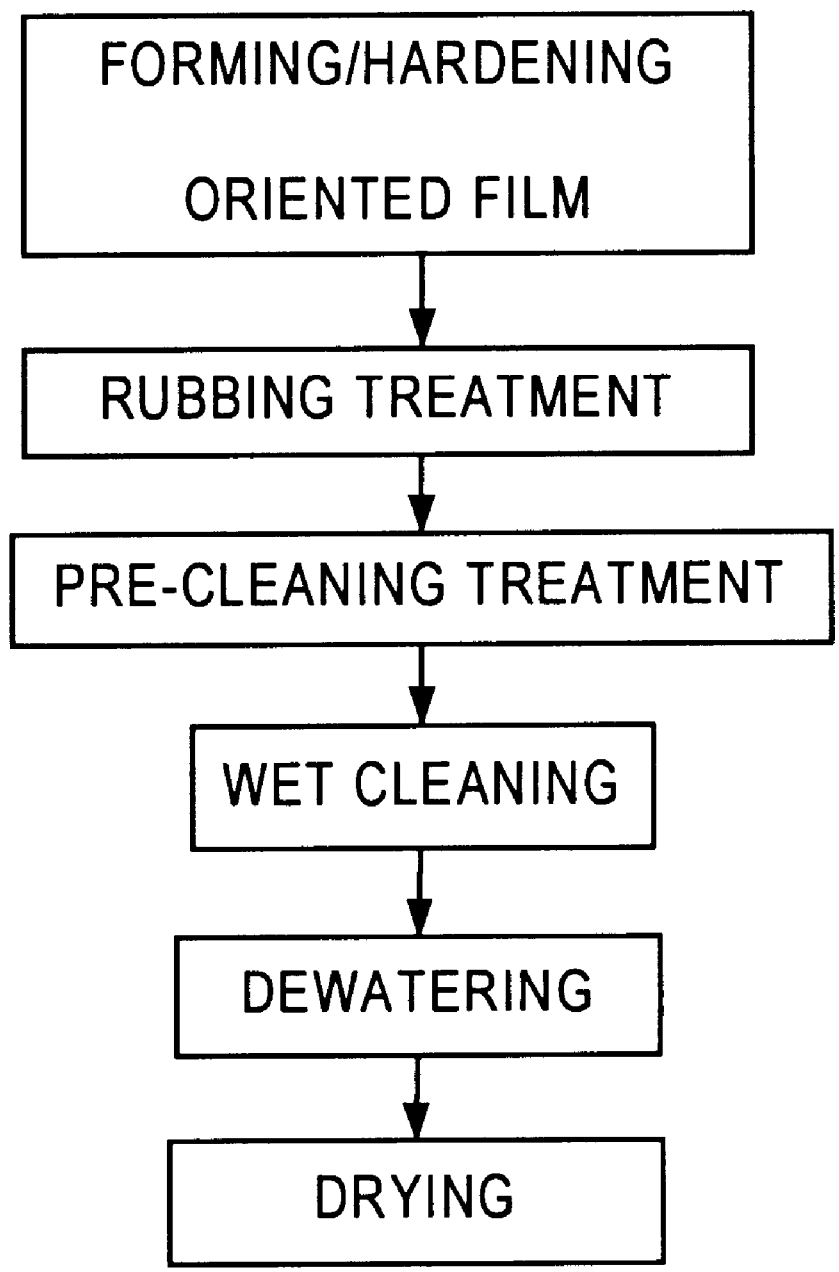
FIG. 1 is a block diagram showing a manufacturing process of the liquid crystal display panel according to Example 1 of the present invention.

A manufacturing method of the liquid crystal display panel according to one example of the invention is hereinafter described with reference to the drawings. FIG. 1 is a block diagram showing a part of the manufacturing process of the liquid crystal display panel according to Example 1 of the invention.

In the manufacturing process of the liquid crystal display panel according to this example, after forming electrodes and others on a glass substrate, as shown in FIG. 1, an oriented film is formed and hardened on the glass substrate on which electrodes and others are formed, and then an orientation is applied to the oriented film by a rubbing treatment in which surface of the oriented film is rubbed using a cloth of nylon, rayon or the like. Then, a wet cleaning is performed to remove a foreign matter stuck in the rubbing step. Before performing the wet cleaning, for the purpose of preventing any irregular orientation due to the water flow in the wet cleaning, a pre-cleaning treatment for forming a water film having no flow on the surface of the glass substrate is performed. Thereafter, the wet cleaning is performed in the form of supersonic wave cleaning, high pressure water flow cleaning, etc., whereby the foreign matter stuck to the surface of the glass substrate is removed. Dewatering and drying are then performed. Subsequently, two such substrates are faced each other and a liquid crystal is charged between the two substrates, thus a liquid crystal display panel is formed.

Figure 2:
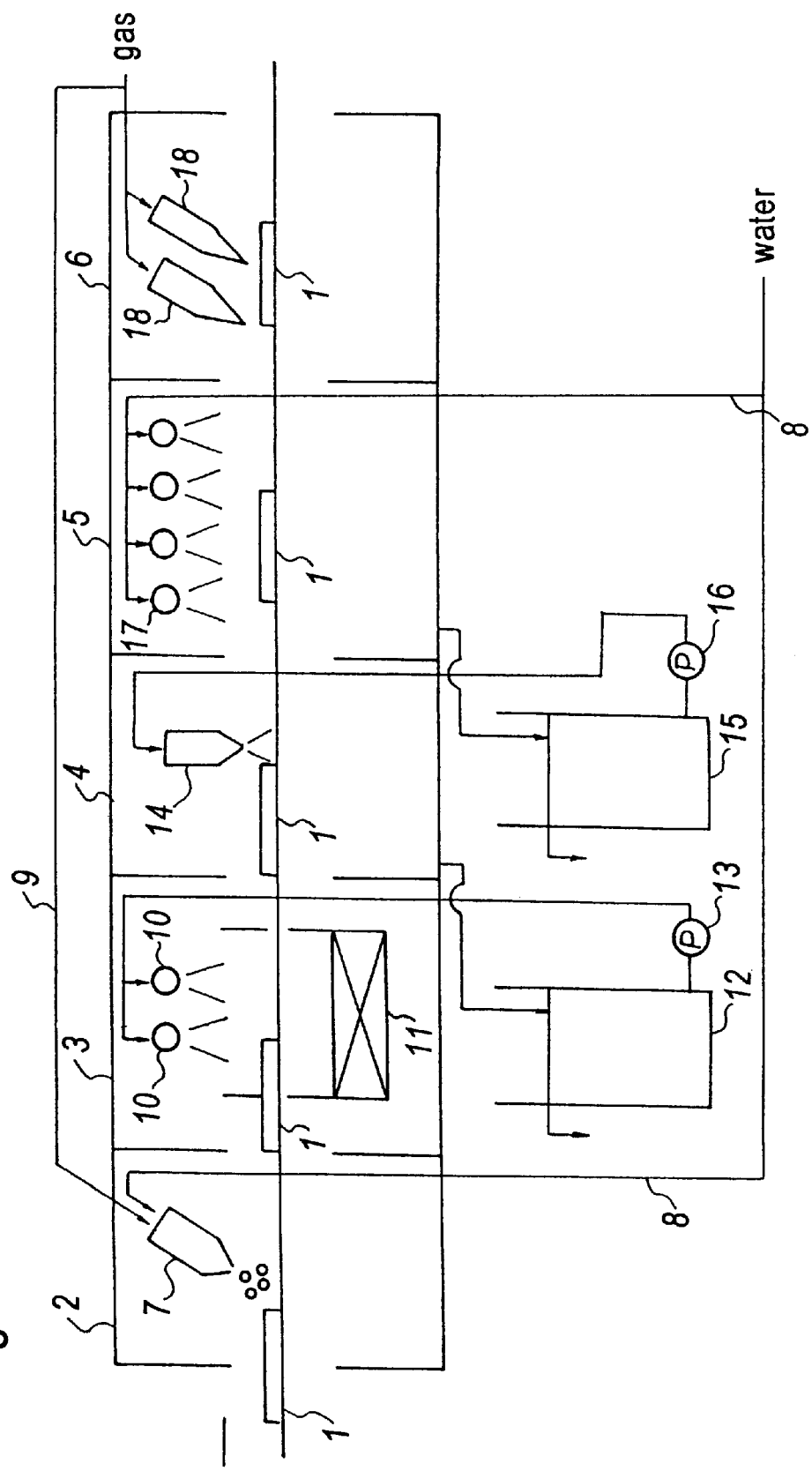
FIG. 2 is a schematic view showing a construction of the cleaning apparatus used in the manufacturing process of the liquid crystal display panel according to Example 1 of the invention.
Figure 3:
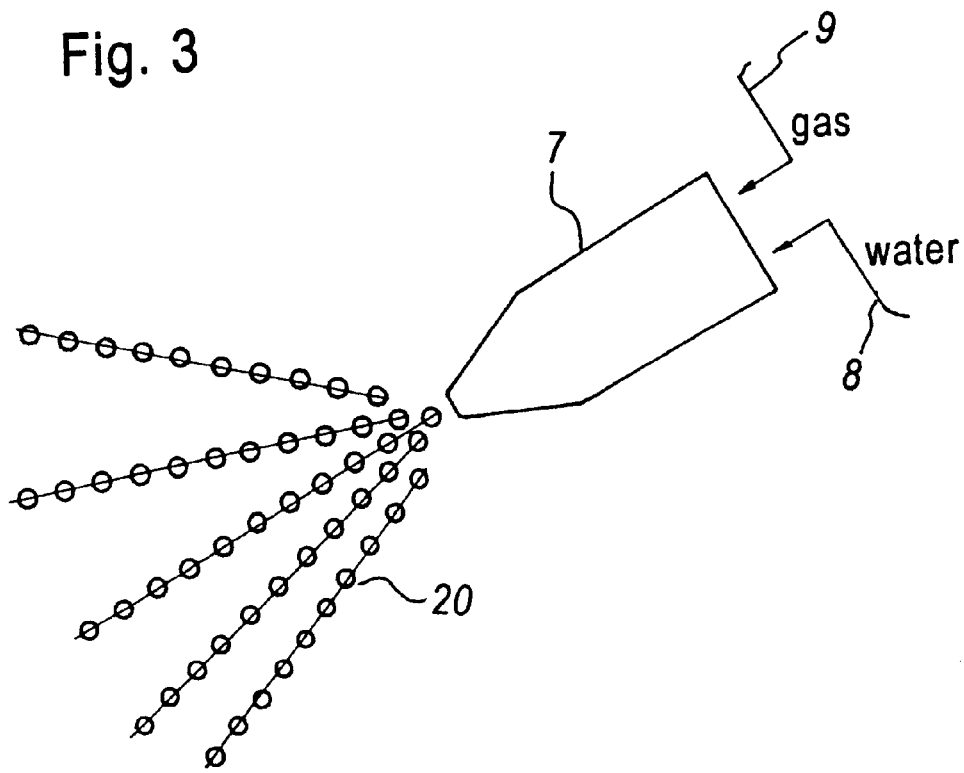
FIG. 3 is an explanatory view to explain a binary fluid nozzle used in the manufacturing process of the liquid crystal display panel according to Example 1 of the invention.

FIG. 2 is a schematic view showing an example of construction of cleaning apparatus to perform the cleaning after the rubbing treatment in the manufacturing process of the liquid crystal display panel according to Example 1, and FIG. 3 is an explanatory view to explain the binary fluid nozzle of the cleaning apparatus shown in FIG. 2.

In the drawings, reference numeral 1 designates a glass substrate forming a liquid crystal display panel, numeral 2 designates a pre-cleaning treatment chamber, numeral 3 designates a supersonic wave cleaning chamber, numeral 4 is a high pressure water flow chamber, numeral 5 is a rinsing chamber, numeral 6 is a drying chamber, and numeral 7 is a binary fluid nozzle disposed in the pre-cleaning treatment chamber 2 and to which a feed water pipe 8 and a gas pipe 9 are connected. Numerals 10 and 11 are a shower nozzle and a supersonic wave tank respectively disposed in the supersonic wave cleaning chamber 3 and to which water is fed from a tank 12 from a pump 13. Numeral 14 is a high pressure spray nozzle disposed in the high pressure water flow chamber 4 and to which water is fed from a tank 15 from a pump 16. Numeral 17 is a shower nozzle disposed in the rinsing chamber 5 and to which the feed water pipe 8 is connected. Numeral 18 is an air knife disposed in the drying chamber 6 and to which the gas pipe 9 is connected. Numeral 20 is mist-like particles of 10 to 100 $\mu$m in particle size sprayed from the binary fluid nozzle 7.

The water sprayed from the shower nozzle 17 of the rinsing chamber 5 is recovered in the tank 15 after the rinsing treatment, and recycled in the high pressure water flow chamber 4. The water sprayed from the high pressure spray nozzle 14 of the high pressure chamber 4 is recovered in the tank 12 after the high pressure cleaning, and recycled in the supersonic wave cleaning chamber 3.

The cleaning process after the rubbing treatment is hereinafter described. The glass substrate 1, on which the oriented film has been formed and to which the rubbing treatment has been applied, is conveyed to the pre-cleaning treatment chamber 2 by a conveyor (not shown), and the surface of the glass substrate 1 is sufficiently covered by the mist-like particles 20 sprayed from the binary fluid nozzle 7 to the extent that the water does not move. Then, the glass substrate 1 is conveyed to the supersonic wave cleaning chamber 3 with the surface covered by the water, and is subject to a supersonic wave cleaning in the supersonic wave tank 11. Subsequently, the glass substrate 1 is conveyed to the high pressure water flow chamber 4, and cleaned with a water sprayed from the high pressure spray nozzle 14. Further, the glass substrate 1 is conveyed to the rinsing chamber to be rinsed by the shower nozzle 17, and finally conveyed to the drying chamber 6 to be dewatered by the air knife 18.

Figure 4:
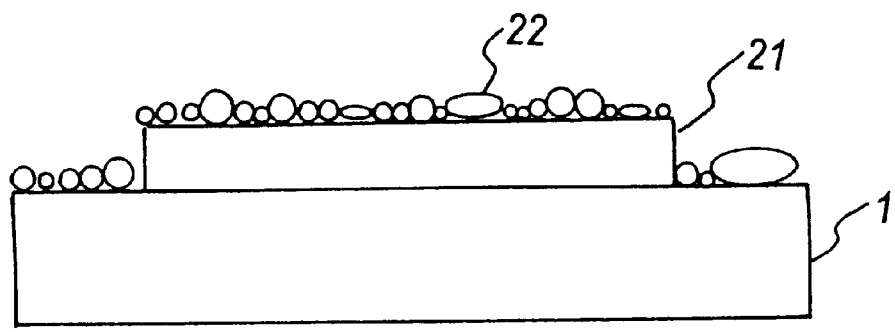
FIG. 4 is a schematic view showing a condition of a substrate in the course of the manufacturing process of the liquid crystal display panel according to Example 1 of the invention.

FIG. 4 is a schematic view showing a condition of the glass substrate 1 after the treatment in the pre-cleaning treatment chamber 2. The mist-like particles 20 sprayed from the binary fluid nozzle 7 in the pre-cleaning treatment chamber 2 become dews 22 on the glass substrate 1 on which the oriented film 21 is formed, and the spray of the mist-like particles 20 is controlled so as not to have any flow, until a thin film of water is formed on the glass substrate closely covering the glass substrate 1.

In this example, since the wet cleaning such as supersonic wave cleaning is performed after forming the water film having no flow on the surface of the glass substrate 1 by spraying the mist-like particles 20 on the surface of the glass substrate 1 in the pre-cleaning treatment chamber 2, in the cleaning step of the glass substrate 1 after the rubbing treatment in the manufacturing process of the liquid crystal display panel, any movement of foreign matter on the substrate due to the cleaning before wetting completely the substrate can be prevented, and occurrence of irregular orientation and spot due to pressure of cleaning water or to the rubbing of the surface of the oriented film can be prevented.

EXAMPLE 2

Figure 5:
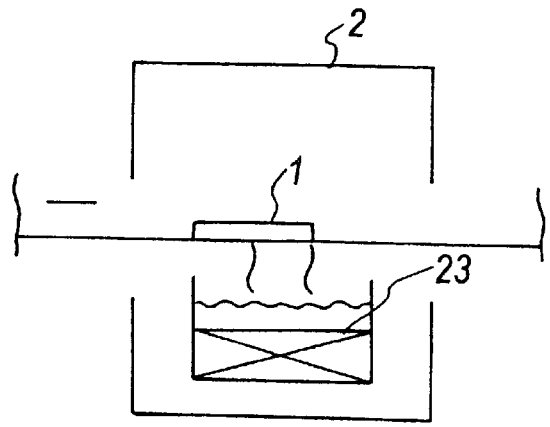
FIG. 5 is a schematic view showing a construction of a pre-cleaning treatment chamber of the cleaning apparatus used in the manufacturing process of the liquid crystal display panel according to Example 2 of the invention.

Though the mist-like particles 20 are sprayed on the glass substrate 1 by producing the mist-like particles 20 through the binary fluid nozzle 7 in the pre-cleaning treatment chamber 2 in the foregoing Example 1, the same advantage as in Example 1 can be also performed by forming a water film on the surface of the glass substrate 1 by disposing a supersonic wave humidifier 23 in the pre-cleaning treatment chamber 2 and vibrating the water with a vibrator so that the pre-cleaning treatment chamber 2 is filled with water particles of fine particle size, as shown in FIG. 5.

Figure 6:
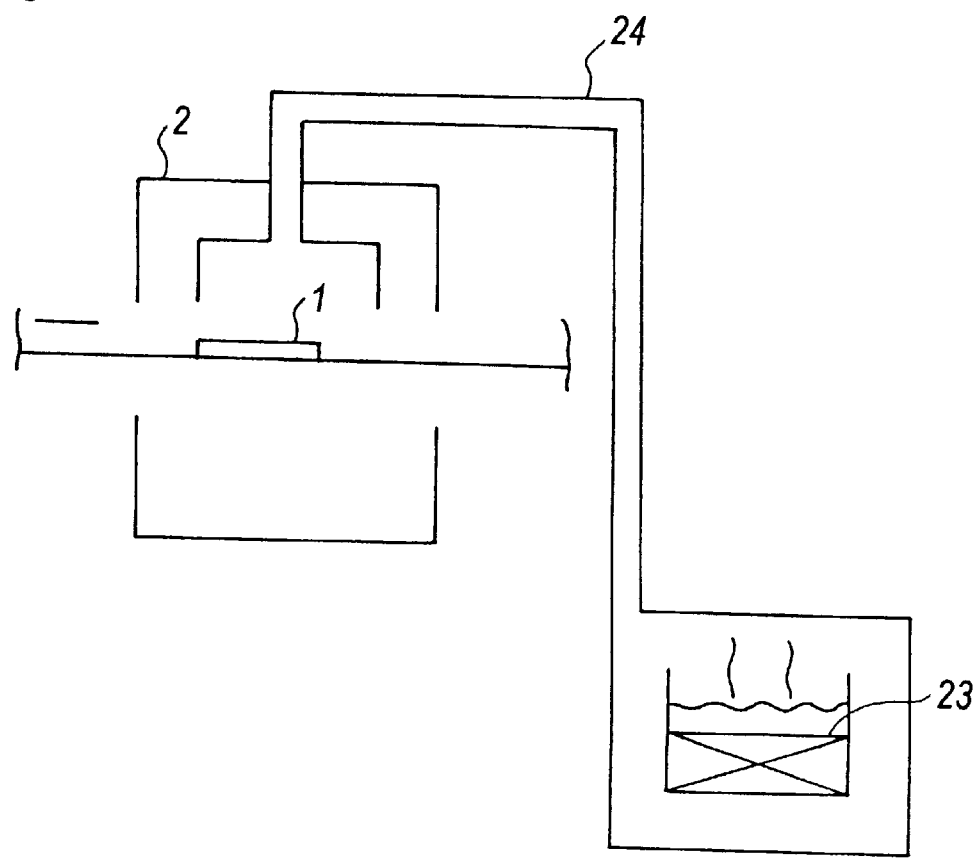
FIG. 6 is a schematic view showing a construction of another pre-cleaning treatment chamber of the cleaning apparatus used in the manufacturing process of the liquid crystal display panel according to Example 2 of the invention.

It is also preferable that the supersonic wave humidifier 23 is disposed outside the pre-cleaning treatment chamber 2, and the water particles of fine particle size are supplied to the pre-cleaning treatment chamber 2 through a conduit 24, as shown in FIG. 6.

EXAMPLE 3

Figure 7A:
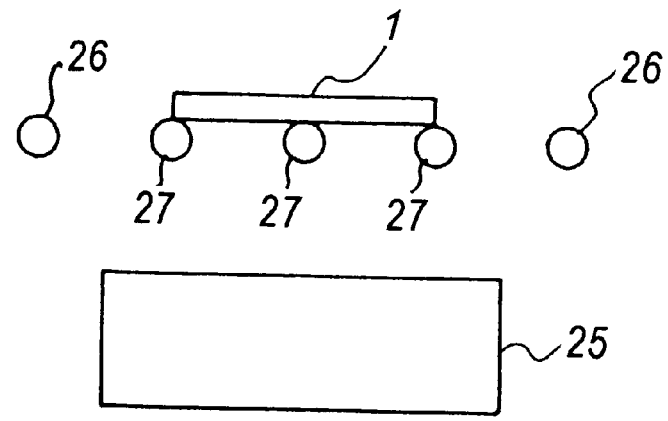
FIGS. 7 (a), (b) and (c) are schematic views each showing a construction of the pre-cleaning treatment chamber of the cleaning apparatus used in the manufacturing process of the liquid crystal display panel according to Example 3 of the invention.
Figure 7B:
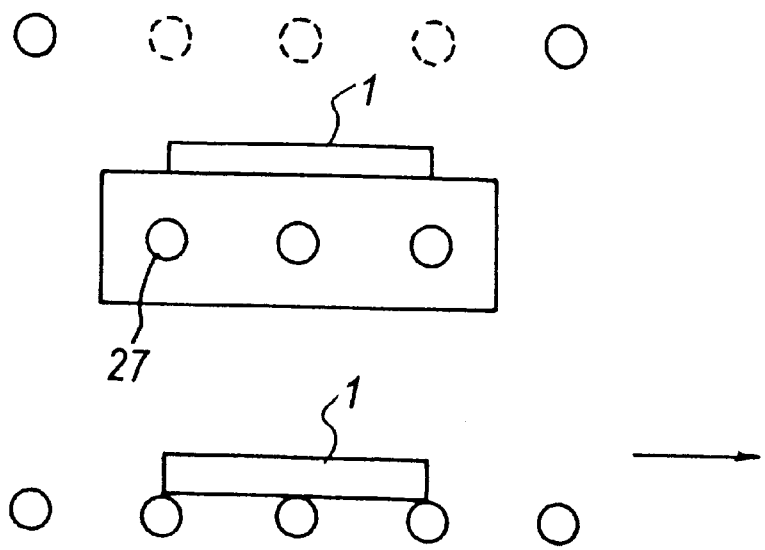
Figure 7C:
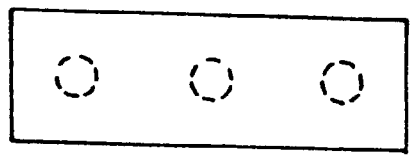

Though the mist-like particles 20 are sprayed on the glass substrate 1 by producing the mist-like particles 20 through the binary fluid nozzle 7 to cover the surface of the glass substrate 1 with the water film having no flow in the pre-cleaning treatment chamber 2 in the foregoing Example 1, the same advantage as in Example 1 can be also performed by forming a water film on the surface of the glass substrate 1 by disposing a cooling plate 25 in the pre-cleaning treatment chamber 2 and contacting closely the cooling plate 25 and the glass substrate 1 so that a water film is formed on the surface of the glass substrate 1 by producing a dew concentration on the surface as a result of cooling the glass substrate 1, as shown in FIG. 7.

In FIG. 7, reference numeral 25 designates the cooling plate 25 disposed in the pre-cleaning treatment chamber 2, numeral 26 designates rollers for conveying the glass substrate 1, and numeral 27 designates conveying rollers movable up and down disposed on the cooling plate 25. When the glass substrate 1 is conveyed on the conveying rollers 27 disposed on the cooling plate 25 of the pre-cleaning treatment chamber 2 (FIG. 7 (a)), the conveying rollers 26, 27 stop rolling, and the conveying rollers 27 movable up and down and supporting the glass substrate 1 move down to the cooling plate 25, whereby the glass substrate 1 contacts the cooling plate 25 to be held thereon (FIG. 7 (b)). After being sufficiently cooled keeping such a condition until forming a water film on the surface of the glass substrate 1 due to the dew concentration, the conveying rollers 27 movable up and down move up to the original conveyance position (FIG. 7 (c)), and then the glass substrate 1 is conveyed in the direction as indicated by the arrow to the next step by rolling the conveying rollers 26, 27.

As a further cooling method of the glass substrate 1, it is also preferable that the glass substrate is cooled either by blowing a cool air to the glass substrate 1 or by cooling the entire pre-cleaning treatment chamber 2.

It is to be understood that the invention is not limited to the foregoing embodiment and various changes and modifications may be made without departing from the spirit and scope of the invention.

What is claimed is:

1. A manufacturing method of a liquid crystal display panel in which two substrates on each of which an electrode and an oriented film are formed are bonded facing each other and a liquid crystal is held between said two substrates, said manufacturing method including the steps of: forming a water film having no flow on the entire surface of said substrates after rubbing said oriented film; and wet cleaning said substrates on which the water film having no flow is formed by supersonic wave or by high pressure spray.

2. A manufacturing method of a liquid crystal display panel according to claim 1, wherein the water film having no flow on the surface of the substrates is formed by adhering mist-like particles to the surface of said substrates.

3. A manufacturing method of a liquid crystal display panel according to claim 2, wherein the mist-like particles are produced by using a binary fluid nozzle.

4. A manufacturing method of a liquid crystal display panel according to claim 2, wherein the mist-like particles are produced by using a supersonic wave humidifier.

5. A manufacturing method of a liquid crystal display panel according to claim 1, wherein the water film having no flow on the surface of said substrates comprises a dew condensation formed on the surface of said substrates by cooling said substrates.

6. A cleaning apparatus in which surface of substrates is cleaned after rubbing a surface of an oriented film formed on said substrates, said cleaning apparatus comprising a pre-cleaning treatment chamber for forming a water film having no flow on the entire surface of the substrate, and a wet cleaning chamber for wet cleaning the substrates on which the water film having no flow is formed by supersonic wave or by high pressure spray.

* * * * *